United States Patent
Jung et al.

(10) Patent No.: US 8,843,631 B2
(45) Date of Patent: Sep. 23, 2014

(54) DYNAMIC LOCAL FUNCTION BINDING APPARATUS AND METHOD

(75) Inventors: Jae-Gyu Jung, Suwon-si (KR);
Kyoung-Hoon Yi, Seoul (KR);
Won-Seok Kwon, Suwon-si (KR);
Che-Uk Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 746 days.

(21) Appl. No.: 12/828,726

(22) Filed: Jul. 1, 2010

(65) Prior Publication Data

US 2011/0138016 A1 Jun. 9, 2011

(30) Foreign Application Priority Data

Dec. 8, 2009 (KR) .................. 10-2009-0121365

(51) Int. Cl.
*G06F 15/173* (2006.01)
*H04L 29/08* (2006.01)

(52) U.S. Cl.
CPC ................................. *H04L 67/16* (2013.01)
USPC ......................................................... 709/226

(58) Field of Classification Search
USPC .......... 709/202, 203, 208, 220, 221, 223, 219
See application file for complete search history.

(56) References Cited

U.S. PATENT DOCUMENTS

| | | | |
|---|---|---|---|
| 6,083,279 A * | 7/2000 | Cuomo et al. ................. | 717/118 |
| 6,426,798 B1 * | 7/2002 | Yeung .......................... | 358/1.13 |
| 6,496,979 B1 * | 12/2002 | Chen et al. .................... | 717/178 |
| 6,691,234 B1 * | 2/2004 | Huff .............................. | 713/300 |
| 6,735,294 B2 * | 5/2004 | Creamer et al. .......... | 379/211.02 |
| 6,757,710 B2 * | 6/2004 | Reed .............................. | 709/203 |
| 6,772,413 B2 * | 8/2004 | Kuznetsov ..................... | 717/136 |
| 7,152,090 B2 * | 12/2006 | Amirisetty et al. ........... | 709/200 |
| 7,466,810 B1 * | 12/2008 | Quon et al. .............. | 379/201.01 |
| 7,555,538 B2 * | 6/2009 | Shenfield et al. ............. | 709/219 |
| 7,647,522 B2 * | 1/2010 | Meijer et al. ....................... | 714/3 |
| 7,836,439 B2 * | 11/2010 | Shenfield ....................... | 717/162 |
| 7,912,822 B2 * | 3/2011 | Bethlehem et al. ........... | 707/705 |
| 8,037,106 B2 * | 10/2011 | Barrenechea ................. | 707/803 |
| 8,341,280 B2 * | 12/2012 | Malladi et al. ................ | 709/230 |
| 2002/0065946 A1 * | 5/2002 | Narayan ....................... | 709/315 |
| 2006/0074618 A1 * | 4/2006 | Miller et al. .................... | 703/13 |
| 2006/0251055 A1 * | 11/2006 | Monette et al. ............... | 370/352 |
| 2007/0061477 A1 | 3/2007 | Stoyanov et al. | |
| 2008/0082857 A1 * | 4/2008 | Meijer et al. ....................... | 714/3 |
| 2009/0077215 A1 * | 3/2009 | Jayanthi ........................ | 709/223 |
| 2009/0271501 A1 * | 10/2009 | Shenfield et al. ............. | 709/219 |

(Continued)

FOREIGN PATENT DOCUMENTS

| | | |
|---|---|---|
| JP | 2007-193429 | 8/2007 |
| JP | 2008-210115 | 9/2008 |

(Continued)

*Primary Examiner* — Sargon Nano
(74) *Attorney, Agent, or Firm* — NSIP Law

(57) ABSTRACT

A dynamic local function binding apparatus and method are provided. In an application virtualization environment, a terminal may register local services associated with local functions of the terminal, and a remote server may call the serviced local functions to be used while the server is executing an application for the terminal. The local functions may be unique functions of various local devices installed in the terminal. The servicing of the local functions may include creating service descriptions of the functions that are provided by the individual local devices and publishing the service descriptions.

13 Claims, 4 Drawing Sheets

(56) References Cited

U.S. PATENT DOCUMENTS

| | | | |
|---|---|---|---|
| 2009/0315766 A1* | 12/2009 | Khosravy et al. | 342/357.07 |
| 2010/0100955 A1* | 4/2010 | Young et al. | 726/17 |
| 2010/0128694 A1* | 5/2010 | Choi-Grogan | 370/331 |
| 2010/0128697 A1* | 5/2010 | Choi-Grogan | 370/332 |
| 2010/0250497 A1* | 9/2010 | Redlich et al. | 707/661 |
| 2011/0251992 A1* | 10/2011 | Bethlehem et al. | 707/610 |

FOREIGN PATENT DOCUMENTS

| | | |
|---|---|---|
| JP | 2008-217272 | 9/2008 |
| JP | 2008-262273 | 10/2008 |
| KR | 10-2008-0053289 | 6/2008 |
| KR | 10-2009-0027624 | 3/2009 |
| WO | WO 2007/142708 | 12/2007 |

\* cited by examiner

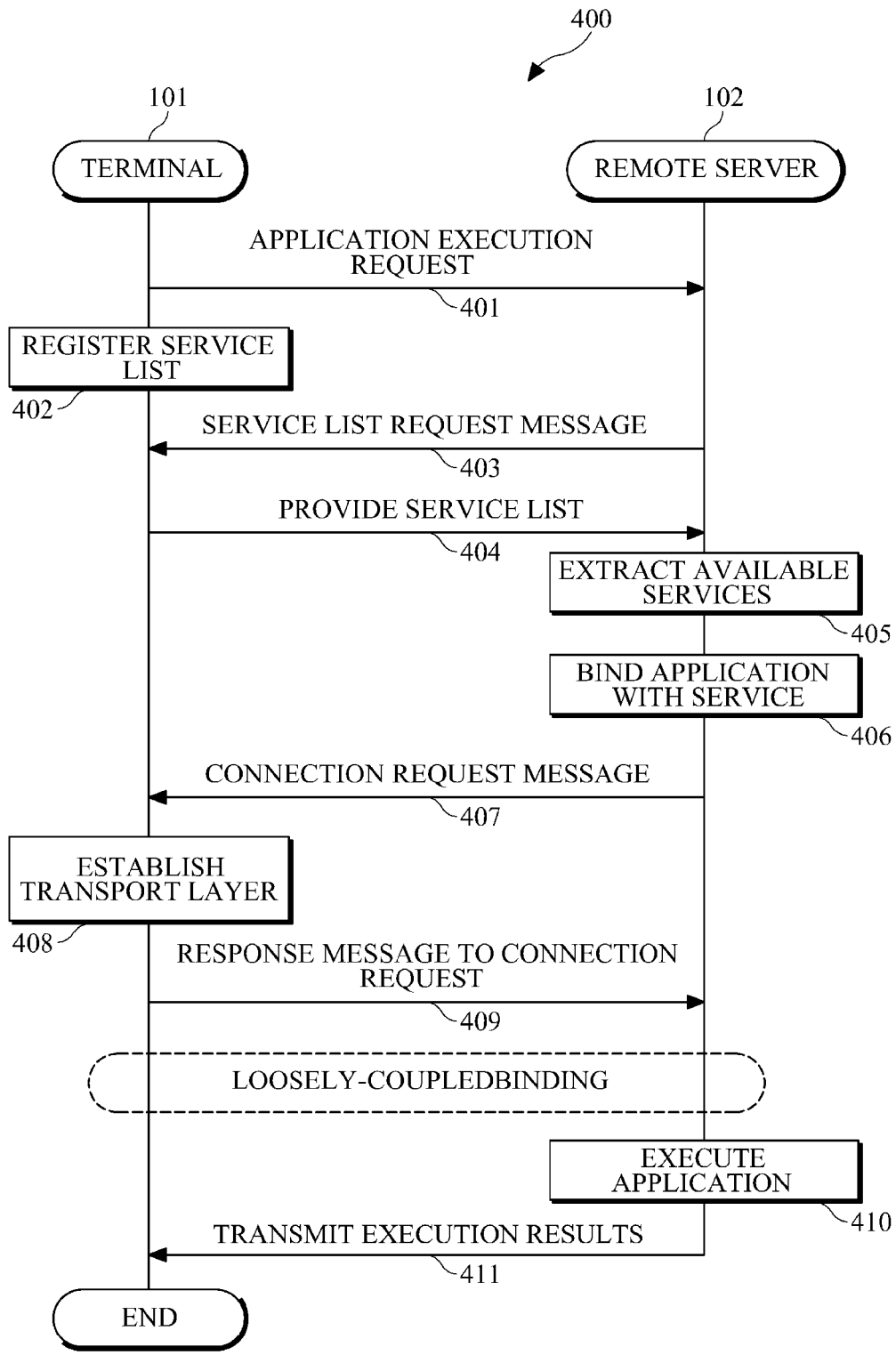

DYNAMIC LOCAL FUNCTION BINDING APPARATUS AND METHOD

CROSS-REFERENCE TO RELATED APPLICATION(S)

This application claims the benefit under 35 U.S.C. §119(a) of Korean Patent Application No. 10-2009-0121365, filed on Dec. 8, 2009, the entire disclosure of which is incorporated herein by reference for all purposes.

BACKGROUND

1. Field

The following description relates to an application virtualization technology, and more particularly, to an application virtualization technology in which a terminal may provide local services to servers executing applications for the terminal.

2. Description of the Related Art

Following the development of enhanced network environments, an application virtualization technology has been introduced in which servers store execution codes and data of applications. Clients are permitted access to the servers as they desire to remotely execute a desired application and then receive the results of the execution streamed from the servers.

In application virtualization, the execution of applications depends greatly on the server environments. In other words, the virtualized applications use computing resources of servers and use simple input/output resources, such as a mouse inputs, display outputs, and the like, from the computing resources of clients.

Accordingly, when a certain application needs a unique function of a local device installed in a client, such application virtualization is not able to operate. For example, Global Positioning System (GPS)-based applications, such as Android Commando, Android Cab4me, and the like, need to access a GPS module of a client in order for the applications to be executed, however, these applications are limited because they cannot access a GPS module of the client, and instead are only able to access applications of the servers.

SUMMARY

In one general aspect, there is provided a dynamic local function binding apparatus of a remote server, the apparatus including a service list requesting unit configured to request, from a terminal, a local service list including local services associated with local functions of the terminal, in response to the remote server receiving a virtualization application execution request from the terminal, a service extractor configured to receive the local service list from the terminal and extract at least one available local service from the local service list, wherein the extracted local service is to be used by the virtualization application, and a service binder configured to bind the extracted local service with the virtualization application so that the local service and the virtualization application may be executed by the remote server.

The local function may be a function performed by a corresponding local device installed in the terminal, and the local device may be at least one of a camera, a microphone, a temperature sensor, a velocity sensor, an acceleration sensor, a Global Positioning System (GPS) module, a security module, and a biometric module.

The local service list may include service descriptions for the local services associated with the local functions of the terminal.

The service binder may use a loosely-coupled binding between the extracted service and the virtualization application according to a Service Oriented Architecture (SOA).

In another aspect, there is provided a dynamic local function binding apparatus of a terminal, the apparatus including a service list registering unit configured to register a service list of local services associated with local functions of the terminal, and a service list providing unit configured to receive a service list request for the service list from a remote server that executes a virtualization application for the terminal, and configured to provide the service list to the remote server.

The local function may be a function performed by a corresponding local device installed in the terminal, and the local device may be at least one of a camera, a microphone, a temperature sensor, a velocity sensor, an acceleration sensor, a Global Positioning System (GPS) module, a security module, and a biometric module.

The service list may include service descriptions for the local services associated with the local functions of the terminal.

In another aspect, there is provided a dynamic local function binding method including registering, at a terminal, a service list of local services associated with local functions of the terminal, transmitting, from the terminal to a remote server, a virtualization application request that requests the remote server to execute a virtualization application for the terminal, requesting, at the remote server, the registered service from the terminal, providing, at the terminal, the is service list to the remote server, receiving, at the remote server, the service list and extracting at least one available local service from the service list, wherein the extracted local service is to be used by the virtualization application, and binding, at the remote server, the extracted local service with the virtualization application so that the local service and the virtualization application may be executed by the remote server.

The local function may be a function performed by a corresponding local device installed in the terminal, and the local device may be at least one of a camera, a microphone, a temperature sensor, a velocity sensor, an acceleration sensor, a Global Positioning System (GPS) module, a security module, and a biometric module.

The service list may include service descriptions for the local services associated with the local functions of the terminal.

The binding of the extracted service with the virtualization application may be based on a loosely-coupled binding according to a Service Oriented Architecture (SOA).

Other features and aspects may be apparent from the following description, the drawings, and the claims.

BRIEF DESCRIPTION OF THE DRAWINGS

FIG. 4 is a diagram illustrating an example of a dynamic local function binding method.

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
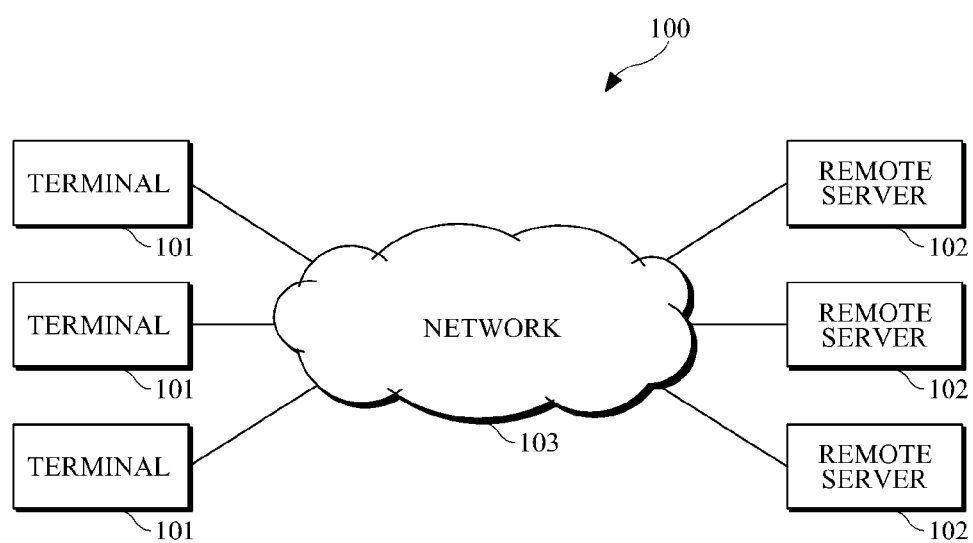
FIG. 1 is a diagram illustrating an example of an application virtualization system.

FIG. 1 illustrates an example of an application virtualization system.

Referring to FIG. 1, the application virtualization system 100 includes one or more terminals 101, one or more remote servers 102, and a network 103. Application virtualization is a technology in which a remote server 102 stores execution codes and data of applications, and in response to receiving an execution request for one of the applications from a terminal 101 over a network 103, the remote server executes the code and provides the results of the execution to the terminal 101. The application may be, for example, one or more virtualization applications.

In some application virtualization environments, execution of an application may be done in a remote server 102 such that a terminal 101 may function only as an input/output device.

According to various examples described herein, the terminal 101 may services its local functions and provide the terminal's local functions to the remote server 102 so that the remote server 102 may use and execute the terminal's local functions.

The local functions of the terminal 101 may be unique functions of various local devices installed in the terminal 101, for example, a camera, a microphone, a temperature sensor, a velocity sensor, an acceleration sensor, a Global Positioning System (GPS) module, a security module, a biometric module, and the like.

Servicing local functions refers to providing the functions of the local devices of the terminal 101 at a service level. That is, the terminal 101 may provide the remote server 102 with functions of the local devices installed in the terminal 101 and may also provide service descriptions for the functions based on a Service Oriented Architecture (SOA).

The remote server 102 calls a service associated with the local function of the terminal 101 and may use the loosely-coupled binding between the service and the application to execute the application. The loosely-coupled binding may be a communication interface or protocol based on the SOA.

For example, because the local functions of the terminal 101 are provided at a service level, an application being executed in the remote server 102 may be bound to any local functions that are called during runtime.

Figure 2:
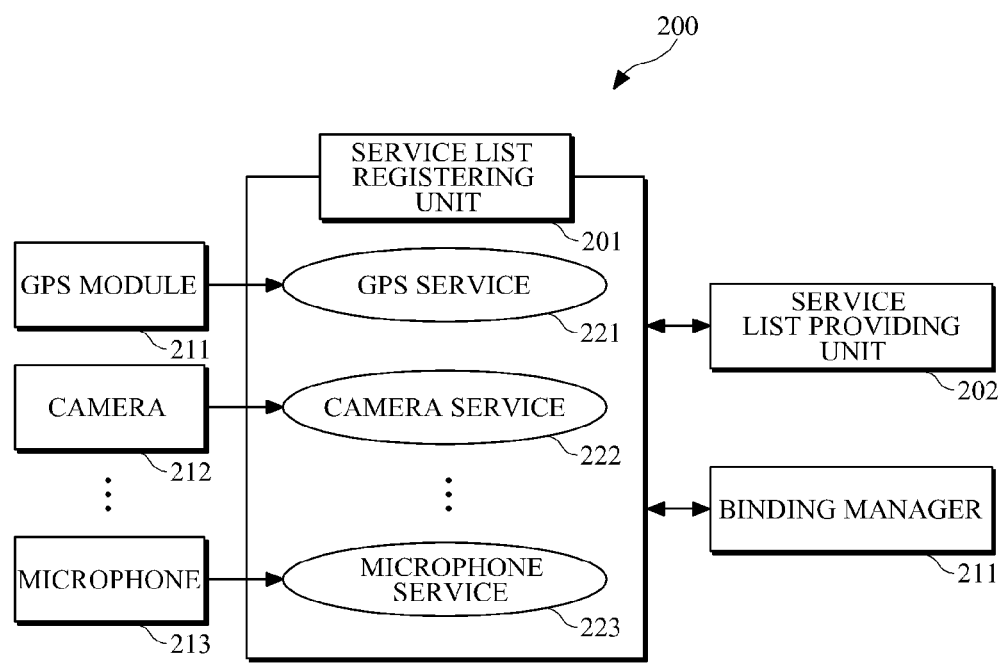
FIG. 2 is a diagram illustrating an example of a dynamic local function binding apparatus.

FIG. 2 illustrates an example of a dynamic local function binding apparatus. The dynamic local function binding apparatus may be a component of a framework or a service layer included in the terminal 101 of FIG. 1.

Referring to FIG. 2, the dynamic local function binding apparatus 200 includes a service list registering unit 201, a service list providing unit 202, and a binding manager 203.

Referring to FIGS. 1 and 2, the service list registering unit 201 registers a list of services associated with the local functions of the terminal 101.

Services associated with the local functions may be services that may be provided and performed by a GPS module 211, a camera 212, a microphone 213, and the like, which may be is installed in the terminal 101. For example, a GPS service 221 may include a service for receiving GPS coordinates or a service for receiving a current time. A camera service 222 may include a photographing function or a zoom in/out function of the camera 212.

The service list registering unit 201 may register the service list by creating identification information of functions that may be provided by the individual local devices, for example, the GPS module 211, the camera 212 and the microphone 213. Also, the service list registering unit 201 may create service descriptions for the functions and then publish them for a remote server 102 to access.

The service list providing unit 202 provides the services, for example, a camera service 222 and a microphone service 223. The service list providing unit 202 may provide the services in response to receiving a service list request for the GPS service 221, the camera service 222, and the microphone service 223 from the remote server 102. For example, the service list providing unit 202 may service the local functions of the terminal 101, thus providing the local functions in the form of a message.

The binding manager 203 provides access to the remote server 102 to bind the application being executed in the remote server 102 with the provided service.

Figure 3:
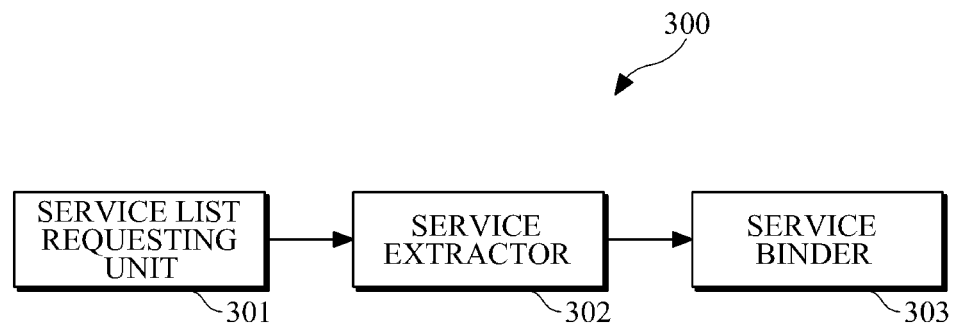
FIG. 3 is a diagram illustrating another example of a dynamic local function binding apparatus.

FIG. 3 is a block diagram illustrating another example of a dynamic local function binding apparatus.

The dynamic local function binding apparatus 300 may be a frame work or a service layer installed in the remote server 102 of FIG. 1. As described herein, the remote server 102 may actually include a plurality of remote servers.

Referring to FIG. 3, the dynamic local function binding apparatus 300 includes a service list requesting unit 301, a service extractor 302, and a service binder 303.

Referring to FIGS. 1 and 3, the service list requesting unit 301 requests a service list for services associated with the local functions of the terminal 101, in response to an application is execution request from the terminal 101. For example, the service list may include identification information of functions that may be provided and performed by the local devices of the terminal 101. The service list may also include service descriptions for the functions, as described above with reference to FIG. 2.

The service extractor 302 receives the service list from the terminal 101 and extracts available services from the service list. For example, the service extractor 302 may interpret a message received from the terminal 101 and extract a service having the same function as that desired by the application being executed.

The service binder 303 binds the extracted service with the application in order to execute the application. In addition, the service binder 303 may include a session manager (not shown) corresponding to the binding manager 203 illustrated in FIG. 2. The session manager 203 may provide connection between the application and the service.

Referring to FIGS. 2 and 3, the terminal 101 may service and register its local functions, and the remote server 102 may call the serviced local functions for use while executing an application. Accordingly, an application being executed in the remote server 102 may remotely access the local functions of the terminal 101 in real-time.

FIG. 4 illustrates an example of a dynamic local function binding method.

Referring to FIG. 4, the terminal 101 may include the dynamic local function binding apparatus 200 described above with reference to FIG. 2, and the remote server 102 may include the dynamic local function binding apparatus 300 described above with reference to FIG. 3. As described herein, the remote server 102 may actually include a plurality of remote servers.

Also, execution codes and data of applications may be stored in the remote server 102. The terminal 101 transmits an execution request for an application and initial setting values to the remote server 102. The remote server 102 executes the corresponding application and is transmits the results of the execution to the terminal 101.

In this example, the terminal 101 requests execution of a certain application to the remote controller 102 and the application is a GPS-based application regarding the location of the terminal 101 in operation 401.

In this example, in operation 402 the terminal 101 registers a service list in which the functions of its local devices are represented at a service level. For example, if the terminal 101 includes the GPS module 211 and the camera module 212 (as shown in the example of FIG. 2), the terminal 101 may register a GPS service, for example, a service for receiving GPS coordinates, a service for receiving a current time, and the like. The terminal may register a camera service, for example, a photographing function, a zoom in/out function, and the like. The registration may include a process of creating and/or publishing service descriptions for individual functions.

In response to an application execution request from the terminal 101, in operation 403 the remote server 102 transmits a service list request message to the terminal 101. The service list request message may be a message for requesting a service list for services that are registered in operation 402. In response to receiving the service list request message, in 404 the terminal transmits a service list for the services registered in operation 402 to the remote server 102.

In operation 405, the remote server 102 that has received the service list extracts available services from the service list. For example, the remote server 102 may interpret the service descriptions provided by the terminal 101 to extract a service having the same local function as that that is needed by the application.

For example, if the terminal 101 includes the GPS module 211 and camera module 212, and the application whose execution has been requested is the GPS-based application, the remote server 102 may extract a GPS service from the service list provided by the terminal 101.

The remote server 102 that has extracted an available service binds the application with the extracted service in operation 406 and then transmits a connection request message to the terminal 101 in operation 407. The connection request message may contain information based on and including which service has been extracted.

The terminal 101 that has received the connection request message establishes a transport layer to allow the remote server 102 to use the function of a local device corresponding to the service in 408. In operation 409, in response to receiving the connection request message, the terminal 101 transmits a message to the remoter server 102.

For example, if a GPS-based service is extracted, the terminal 101 may establish a communication channel to enable the remote server 102 and/or the application being executed by the remote server 102 to use the function of the GPS module 211 that is installed in the terminal 101.

In operation 410, the remote server 102 that has received the response message executes the application based on a loosely-coupled binding between the application and the GPS-based service. For example, when the application being executed in the remote server 102 needs coordinate values indicating the location of the terminal 101, the application may acquire the location coordinates of the terminal 101 by controlling the GPS module 221 of the terminal 101 or by receiving location values measured by the GPS module 211.

In operation 411, the remote server 102 transmits the execution results of the application that has been executed based on the loosely-coupled binding, to the terminal 101.

Accordingly, because the local functions of the terminal 101 are provided at a service level, the application being executed in the remote server 102 can use the local functions of the terminal 101.

The terminal described herein is configured to extract local services that are capable of is being performed/provided by the terminal. In addition, the terminal can publish the local services such that a server that remotely accesses the terminal can determine the available local services capable of being provided/performed by the terminal. Accordingly, when the server is executing a virtualization application for the terminal, the server may access local services of the terminal that are capable of being performed by the terminal, and the server may use/execute those local services while executing the virtualization application.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dynamic local function binding apparatus of a remote server, the apparatus comprising:
   a service list requesting processor configured to request, from a terminal, a local service list comprising local services associated with local functions of the terminal, in response to the remote server receiving a virtualization application execution request from the terminal;
   a service extracting processor configured to:
      receive the local service list from the terminal; and
      extract at least one available local service from the local service list, the extracted local service being a local service that is used by the virtualization application; and
   a service binding processor configured to bind the extracted local service with the virtualization application at runtime such that the local service and the virtualization application are executable by the remote server.

2. The dynamic local function binding apparatus of claim 1, wherein:
   the local function comprises a function performed by a corresponding local device installed in the terminal; and
   the local device comprises at least one of: a camera, a microphone, a temperature sensor, a velocity sensor, an acceleration sensor, a Global Positioning System (GPS) module, a security module, and a biometric module.

3. The dynamic local function binding apparatus of claim 1, wherein the local service list comprises service descriptions for the local services associated with the local functions of the terminal.

4. The dynamic local function binding apparatus of claim 1, wherein the service binding processor is further configured to use a loosely-coupled binding between the extracted service and the virtualization application according to a Service Oriented Architecture (SOA).

5. A dynamic local function binding apparatus of a terminal, the apparatus comprising:
   a service list registering processor configured to register a service list of local services associated with local functions of the terminal; and
   a service list providing processor configured to:
      receive a service list request for the service list from a remote server, the remote server configured to execute a virtualization application for the terminal; and
      provide the service list to the remote server,
      wherein the remote server is configured to access a local service from the service list while executing the virtualization application after the local service is bound, at runtime, to the virtualization application.

6. The dynamic local function binding apparatus of claim 5, wherein:
   the local function comprises a function performed by a corresponding local device installed in the terminal; and
   the local device is at least one of: a camera, a microphone, a temperature sensor, a velocity sensor, an acceleration sensor, a Global Positioning System (GPS) module, a security module, and a biometric module.

7. The dynamic local function binding apparatus of claim 5, wherein the service list comprises service descriptions for the local services associated with the local functions of the terminal.

8. A dynamic local function binding method, comprising:
   registering, at a terminal, a service list of local services associated with local functions of the terminal;
   transmitting, from the terminal to a remote server, a virtualization application request that requests the remote server to execute a virtualization application for the terminal;
   requesting, at the remote server, the registered service from the terminal;
   providing, at the terminal, the service list to the remote server;
   receiving, at the remote server, the service list and extracting at least one available local service from the service list, the extracted local service being a local service that is used by the virtualization application; and
   binding, at the remote server, the extracted local service with the virtualization application at runtime such that the local service and the virtualization application are executable by the remote server.

9. The dynamic local function binding method of claim 8, wherein:
   the local function is a function performed by a corresponding local device installed in the terminal; and
   the local device comprises at least one of: a camera, a microphone, a temperature sensor, a velocity sensor, an acceleration sensor, a Global Positioning System (GPS) module, a security module, and a biometric module.

10. The dynamic local function binding method of claim 8, wherein the service list comprises service descriptions for the local services associated with the local functions of the terminal.

11. The dynamic local function binding method of claim 8, wherein the binding of the extracted service with the virtualization application is based on a loosely-coupled binding according to a Service Oriented Architecture (SOA).

12. The dynamic local function binding apparatus of claim 1, wherein results of the executed virtualization application are transmitted to the terminal.

13. The dynamic local function binding apparatus of claim 1, wherein in response to a connection request message sent by the remote server, the terminal sends a response message to the remote server.

* * * * *